(12) United States Patent
Papasakellariou

(10) Patent No.: US 10,326,493 B2
(45) Date of Patent: Jun. 18, 2019

(54) CONTROL CHANNEL TRANSMISSION AND FREQUENCY ERROR CORRECTION

(71) Applicant: Samsung Electronics Co., Ltd, Suwon-si (KR)

(72) Inventor: Aris Papasakellariou, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/152,461

(22) Filed: May 11, 2016

(65) Prior Publication Data

US 2016/0337157 A1 Nov. 17, 2016

Related U.S. Application Data

(60) Provisional application No. 62/160,895, filed on May 13, 2015, provisional application No. 62/212,684, filed on Sep. 1, 2015.

(51) Int. Cl.
*H04B 3/23* (2006.01)
*H04L 5/00* (2006.01)
*H04L 1/18* (2006.01)
*H04L 5/14* (2006.01)

(52) U.S. Cl.
CPC ........... *H04B 3/232* (2013.01); *H04L 1/1893* (2013.01); *H04L 5/0016* (2013.01); *H04L 5/0053* (2013.01); *H04L 5/0037* (2013.01); *H04L 5/0051* (2013.01); *H04L 5/0082* (2013.01); *H04L 5/1469* (2013.01)

(58) Field of Classification Search
CPC ... H04B 3/232; H04L 1/1893; H04L 27/2613; H04L 27/2657; H04L 27/2671; H04L 27/2675; H04L 5/0016; H04L 5/0048; H04L 5/0053; H04L 5/0069; H04L 5/0082
USPC ........................................................ 370/329
See application file for complete search history.

(56) References Cited

U.S. PATENT DOCUMENTS

| | | | |
|---|---|---|---|
| 2013/0083753 A1 | 4/2013 | Lee et al. | |
| 2013/0121317 A1* | 5/2013 | Lee | H04L 5/0042 370/336 |
| 2013/0272215 A1* | 10/2013 | Khoryaev | H04W 28/02 370/329 |
| 2013/0322363 A1* | 12/2013 | Chen | H04W 72/042 370/329 |
| 2014/0098761 A1* | 4/2014 | Lee | H04W 74/006 370/329 |

(Continued)

OTHER PUBLICATIONS

International Search Report dated Aug. 26, 2016 in connection with International Application No. PCT/KR2016/005032, 4 pages.

(Continued)

*Primary Examiner* — Stephen J Clawson

(57) ABSTRACT

Methods and apparatus are provided to enable repetitions of a physical uplink control channel transmission with frequency retuning and to enable frequency offset correction using replicas of received data symbols or received control symbols in repetitions of a channel reception. Methods and apparatus are also provided for multiplexing physical uplink control channel transmissions with different numbers of repetitions and for adjusting a number of repetitions for a channel transmission based on an adjustment of a frequency offset.

12 Claims, 8 Drawing Sheets

(56) References Cited

U.S. PATENT DOCUMENTS

| | | | |
|---|---|---|---|
| 2014/0198772 A1* | 7/2014 | Baldemair | H04L 27/2655 370/335 |
| 2015/0195069 A1* | 7/2015 | Yi | H04L 5/0053 370/329 |
| 2016/0226639 A1* | 8/2016 | Xiong | H04L 5/0053 |
| 2016/0338088 A1* | 11/2016 | Fakoorian | H04W 72/1263 |
| 2018/0083752 A1* | 3/2018 | Kim | H04L 1/18 |

OTHER PUBLICATIONS

NEC, "Details of the UL Frequency Hopping Scheme for LTE Rel-13 MTC", 3GPP TSG RAN WG1 Meeting #80bis, R1-151557, Belgrade, Serbia, Apr. 20-24, 2015, 2 pages.

Huawei, et al., "PUCCH and UCI for MTC and Coverage Enhancement", 3GPP TSG RAN WG1 Meeting #80bis, R1-151267, Belgrade, Serbia, Apr. 20-24, 2015, 5 pages.

LG Electronics, "Discussions on Frequency Hopping and Subband for Rel-13 MCT UEs", 3GPP TSG RAN WG1 Meeting #80bis, R1-151486, Belgrade, Serbia, Apr. 20-24, 2015, 5 pages.

3GPP TS 36.211 V12.4.0 (Dec. 2014) 3rd Generation Partnership Project;Technical Specification Group Radio Access Network;E-UTRA;Physical channels and modulation(Release12)124pgs.

3GPP TS 36.212 V12.3.0 (Dec. 2014)3rd Generation Partnership Project;Technical Specification Group Radio Access Network;E-UTRA; Multiplexing and channel coding (Release 12)89pgs.

3GPP TS 36.213 V12.4.0 (Dec. 2014) 3rd Generation Partnership Project;Technical Specification Group Radio Access Network;E-UTRA; Physical layer procedures (Release 12)225pgs.

3GPPTS36.321V12.4.0(Dec. 2014)3rd Generation Partnership Project-;Technical SpecificationGroup Radio Access Network; (E-UTRA); MAC Release 12 60 pgs.

3GPP TS 36.331 V12.4.0 (Dec. 2014) 3rd Generation Partnership Project; Technical Specification Group Radio Access Network; (E-UTRA); RRC Protocol spec Release 12 410 pages.

European Patent Office, "Supplementary European Search Report," Application No. EP16793019.7, Nov. 30, 2018, 10 pages.

LG Electronics, "Design issues on PUCCH for MTC UE," R1-151491, 3GPP TSG RAN WG1 Meeting #80bis, Belgrade, Serbia, Apr. 20-24, 2015, 4 pages.

* cited by examiner

CONTROL CHANNEL TRANSMISSION AND FREQUENCY ERROR CORRECTION

CROSS-REFERENCE TO RELATED APPLICATION AND CLAIM OF PRIORITY

The present application claims priority under 35 U.S.C. § 119(e) to: U.S. Provisional Patent Application Ser. No. 62/160,895 filed May 13, 2015, entitled "FREQUENCY OFFSET CORRECTION IN COVERAGE ENHANCED OPERATION;" and U.S. Provisional Patent Application Ser. No. 62/212,684 filed Sep. 1, 2015, entitled "PHYSICAL UPLINK CONTROL CHANNEL STRUCTURE FOR COVERAGE ENHANCEMENTS." The contents of the above-identified patent documents are incorporated herein by reference.

TECHNICAL FIELD

The present application relates generally to wireless communications and, more specifically, to transmitting from a user equipment a physical uplink control channel with repetitions and frequency retuning and to performing, at a base station or at a user equipment, frequency error correction based on a reception of a channel transmitted with repetitions.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

This disclosure provides methods and apparatus to enable retuning in different narrowbands for repetitions of a physical uplink control channel transmission and to enable frequency offset correction using replicas of received data symbols or received control symbols in repetitions of a channel reception.

In a first embodiment, a method is provided. The method includes transmitting a data channel. The method also includes receiving repetitions of a control channel in response to the transmission of the data channel. A first number of the control channel repetitions is received in a first narrowband over a first number of subframes and a second number of the control channel repetitions is received in a second narrowband over a second number of subframes. The control channel is not received in either of a last subframe symbol of a last repetition in a first narrowband or in a first subframe symbol of the first repetition in the second narrowband.

In a second embodiment, a base station is provided. The base station includes a transmitter and a receiver. The transmitter is configured to transmit a data channel. The receiver configured to receive repetitions of a control channel in response to the transmission of the data channel. A first number of the control channel repetitions is received in a first narrowband over a first number of subframes and a second number of the control channel repetitions is received in a second narrowband over a second number of subframes. The control channel is not received in either of a last subframe symbol of a last repetition in the first narrowband or in a first subframe symbol of a first repetition in the second narrowband.

In a third embodiment, a user equipment (UE) is provided. The UE includes a receiver and a transmitter. The receiver is configured to receive a data channel. The transmitter is configured to transmit repetitions of a control channel in response to the reception of the data channel. A first number of the control channel repetitions is transmitted in a first narrowband over a first number of subframes and a second number of the control channel repetitions is transmitted in a second narrowband over a second number of subframes. The control channel is not transmitted in either of a last subframe symbol of a last repetition in the first narrowband or in a first subframe symbol of a first repetition in the second narrowband.

In a fourth embodiment, a method is provided. The method includes receiving a number of repetitions for a channel over a respective number of subframes and over a bandwidth that includes a number of sub-carriers (SCs). Each subframe from the number of subframes includes a number of symbols. The method also includes correlating, for multiple symbols and for multiple SCs, a reception in a SC k and in a symbol l of a first subframe for a first of the number of repetitions with a reception in a SC k and in a symbol l of a second subframe for a second of the number of repetitions. The method additionally includes adding the correlations for the multiple symbols and the multiple SCs. The method further includes estimating a frequency offset from a phase of the added correlations. The method also includes adjusting a frequency of a reception based on the frequency offset.

In a fifth embodiment, a device is provided. The device includes a receiver, a correlator, an adder, a frequency offset estimator, and a frequency offset adjustor. The receiver is configured to receive a number of repetitions for a channel over a respective number of subframes and over a bandwidth that includes a number of sub-carriers (SCs). Each subframe from the number of subframes includes a number of symbols. The correlator is configured to correlate, for multiple symbols and for multiple SCs, a reception in a SC k and in a symbol l of a first subframe for a first of the number of repetitions with a reception in a SC k and in a symbol l of a second subframe for a second of the number of repetitions. The adder is configured to add the correlations for the multiple symbols and the multiple SCs. The frequency offset estimator is configured to estimate a frequency offset from a phase of the added correlations. The frequency offset adjustor is configured to adjust a frequency of a reception based on the frequency offset.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

The following documents and standards descriptions are hereby incorporated by reference into the present disclosure as if fully set forth herein: 3GPP TS 36.211 v12.4.0, "E-UTRA, Physical channels and modulation" (REF 1); 3GPP TS 36.212 v12.3.0, "E-UTRA, Multiplexing and Channel coding" (REF 2); 3GPP TS 36.213 v12.4.0, "E-UTRA, Physical Layer Procedures" (REF 3); 3GPP TS 36.321 v12.4.0, "E-UTRA, Medium Access Control (MAC) protocol specification" (REF 4); and 3GPP TS 36.331 v12.4.0, "E-UTRA, Radio Resource Control (RRC) Protocol Specification" (REF 5).

This disclosure relates to transmitting a physical uplink control channel (PUCCH) with repetitions and retuning in different narrowbands from a user equipment (UE) and to performing frequency error correction based on a reception of a channel transmitted with repetitions at a base station or at a UE. A wireless communication network includes a downlink (DL) that conveys signals from transmission points, such as base stations or enhanced NodeBs (eNBs), to UEs. The wireless communication network also includes an uplink (UL) that conveys signals from UEs to reception points, such as eNBs.

Figure 1:
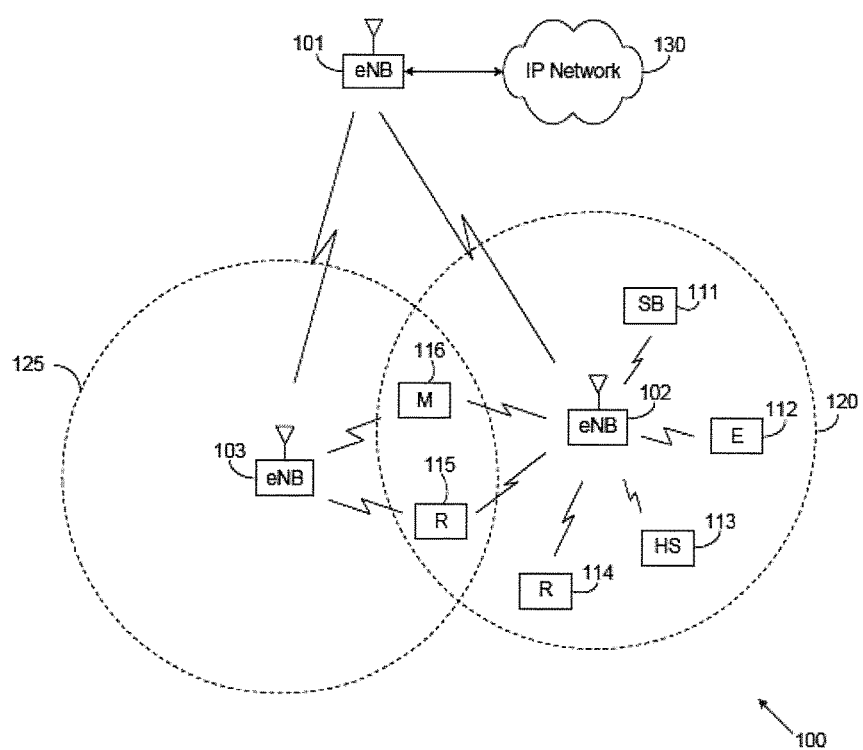
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms can be used instead of "NodeB" or "eNB," such as "base station" or "access point." For the sake of convenience, the terms "NodeB" and "eNB" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." A UE, can be fixed or mobile and can be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of UEs within a coverage area 120 of the eNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, can have other shapes, including irregular shapes, depending upon the configuration of the eNBs and variations in the radio environment associated with natural and man-made obstructions.

As described in more detail below, various components of the network 100, such as the eNBs 101-103, can receive PUCCH transmissions with repetitions and frequency retuning from UEs 111-116 and perform frequency error correction based on reception of channels transmitted with repetitions from UEs 111-116. In addition, one or more of UEs 111-116 can perform PUCCH transmissions with repetitions for communication between one or more of eNBs 101-103 and perform frequency error correction based on reception of channels transmitted with repetitions from eNBs 101-103.

Although FIG. 1 illustrates one example of a wireless network 100, various changes can be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
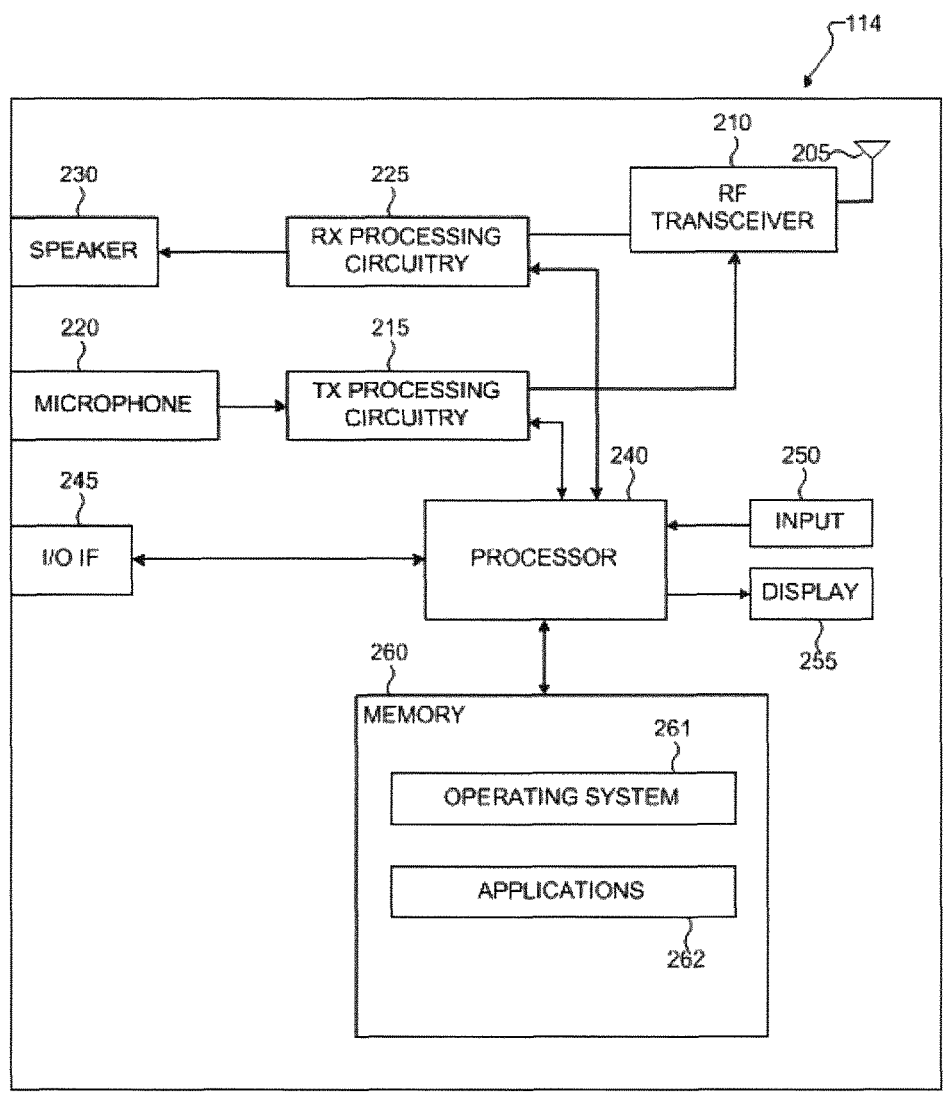
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a processor 240, an input/output (I/O) interface (IF) 245, an input 250, a display 255, and a memory 260. The memory 260 includes an operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The processor 240 can include one or more processors or other processing devices and can execute the OS program 261 stored in the memory 260 in order to control the overall operation of the UE 114. For example, the processor 240 could control the reception of forward channel signals and the transmission of reverse channel signals by the RF transceiver 210, the RX processing circuitry 225, and the TX processing circuitry 215 in accordance with well-known principles. In some embodiments, the processor 240 includes at least one microprocessor or microcontroller.

The processor 240 is also capable of executing other processes and programs resident in the memory 260. The processor 240 can move data into or out of the memory 260 as required by an executing process. In some embodiments, the processor 240 is configured to execute the applications 262 based on the OS program 261 or in response to signals received from eNBs, other UEs, or an operator. The processor 240 is also coupled to the I/O interface 245, which provides the UE 114 with the ability to connect to other devices such as laptop computers and handheld computers. The I/O interface 245 is the communication path between these accessories and the processor 240.

The processor 240 is also coupled to the input 250 (e.g., touchscreen, keypad, etc.) and the display 255. The operator of the UE 114 can use the input 250 to enter data into the UE 114. The display 255 may be a liquid crystal display or other display capable of rendering text and/or at least limited graphics, such as from web sites. The display 255 could also represent a touch-screen.

The memory 260 is coupled to the processor 240. Part of the memory 260 could include a broadcast signaling memory (RAM), and another part of the memory 260 could include a Flash memory or other read-only memory (ROM).

As described in more detail below, the transmit and receive paths of the UE 114 support transmitting a PUCCH with repetitions and frequency retuning and support performing frequency error correction based on reception of channels transmitted with repetitions. In certain embodiments, the TX processing circuitry 215 and RX processing circuitry 225 include processing circuitry configured to support transmission of a PUCCH with repetitions and to perform frequency error correction based on received repetitions of a channel. In certain embodiments, the processor 240 is configured to control the RF transceivers 210, the TX processing circuitry 215, or the RX processing circuitry 225, or a combination thereof, to support transmission of a PUCCH with repetitions and perform frequency error correction based on received repetitions of a channel.

Although FIG. 2 illustrates one example of UE 114, various changes can be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). Also, while FIG. 2 illustrates the UE 114 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
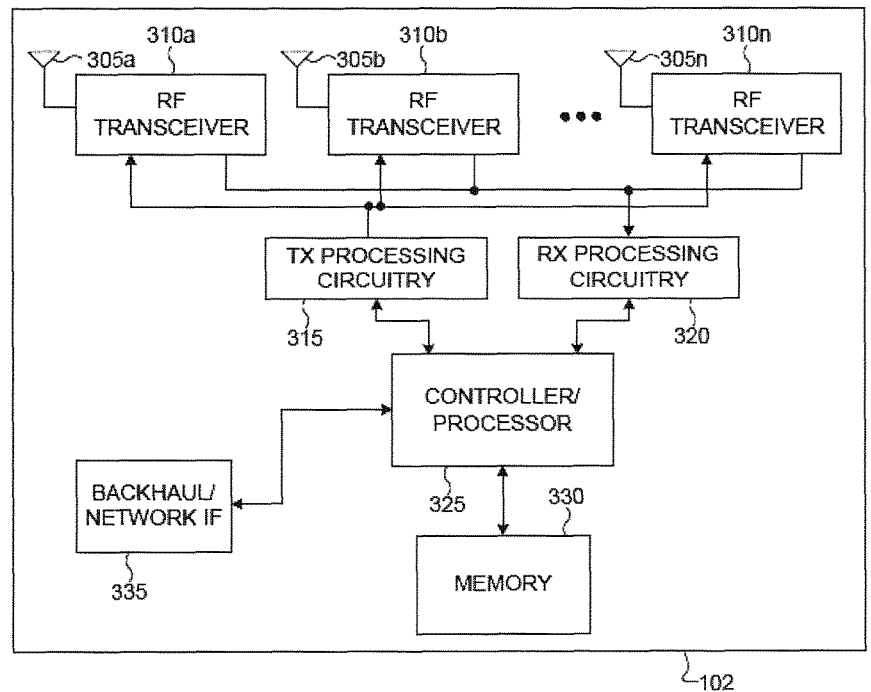
FIG. 3 illustrates an example enhanced NodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as an OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the receive paths of the eNB 102 support reception of a PUCCH transmitted with repetitions and frequency retuning and support performing frequency error correction based on reception of channels transmitted with repetitions. In certain embodiments, the TX processing circuitry 315 and RX processing circuitry 320 include processing circuitry configured to support reception of a PUCCH transmitted with repetitions and frequency retuning and to support frequency error correction based on received repetitions of a channel. In certain embodiments, the processor 240 is configured to control the RF transceivers 310a-310n, TX processing circuitry 315 or RX processing circuitry 320, or a combination thereof, to support reception of a PUCCH transmitted with repetitions and frequency retuning and to support frequency error correction based on received repetitions of a channel.

Although FIG. 3 illustrates one example of an eNB 102, various changes can be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

A transmission time interval (TTI) for DL signaling or UL signaling is referred to as a subframe (SF) and includes two slots. A slot includes seven SF symbols when a normal cyclic prefix (CP) is used or six SF symbols when an extended CP is used (see also REF 1). A unit of ten SFs is referred to as a frame. A bandwidth (BW) unit is referred to as a resource block (RB), one RB over one slot is referred to as a physical RB (PRB) and one RB over one SF is referred to as a PRB pair.

In some wireless networks, DL signals include data signals conveying information content, control signals conveying DL control information (DCI), and reference signals (RS) that are also known as pilot signals. The eNB 102 transmits data information through respective physical DL shared channels (PDSCHs). The eNB 102 also transmits DCI through respective physical DL control channels (PDCCHs). The eNB 102 can transmit one or more of multiple types of RS including a UE-common RS (CRS), a channel state information RS (CSI-RS), and a demodulation RS (DMRS)—see also REF 1. The eNB 102 transmits a CRS over a DL system BW and the CRS can be used by UEs to demodulate data or control signals or to perform measurements. To reduce CRS overhead, the eNB 102 can transmit a CSI-RS with a smaller density in the time and/or frequency domain than a CRS. UE 114 can determine CSI-RS transmission parameters, when applicable, through higher layer signaling from eNB 102. DMRS is transmitted only in the BW of a respective PDSCH or PDCCH and UE 114 can use the DMRS to demodulate information in the PDSCH or the PDCCH. DL signals also include transmission of channels that convey system information (SI) such as a physical broadcast channel (PBCH) that conveys a master information block (MIB) or PDSCHs that convey system information blocks (SIBS)—see also REF 3 and REF 5.

Information symbols (data or control) in PBCH, PDSCH, or PDCCH transmission are scrambled with a scrambling sequence. For example, for each codeword $q$, a block of encoded data bits $b^{(q)}(0), \ldots, b^{(q)}(M_{bit}^{(q)}-1)$, where $M_{bit}^{(q)}$ is a number of bits in codeword $q$ transmitted on a physical channel in a SF, is scrambled prior to modulation (see also REF 1).

In some wireless networks, UL signals include data signals conveying data information, control signals conveying UL control information (UCI), and UL RS. UE 114 transmits data information or UCI through a respective physical UL shared channel (PUSCH) or a physical UL control channel (PDCCH). When UE 114 needs to transmit data information and UCI in a same SF, UE 114 can multiplex both in a PUSCH. The UCI includes HARQ acknowledgement (HARQ-ACK) information indicating correct (ACK) or incorrect (NACK) detection for data transport block (TB) in a PDSCH, or absence of a PDCCH detection (DTX), scheduling request (SR) indicating whether UE 114 has data in its buffer, and channel state information (CSI) enabling eNB 102 to select appropriate parameters for PDSCH transmissions to UE 114. HARQ-ACK information is also transmitted by UE 114 in response to a detection of a PDCCH indicating a release of semi-persistently scheduled (SPS) PDSCH (see also REF 3). For brevity, this is not explicitly mentioned in the following descriptions. In addition to the CSI, UE 114 can provide to eNB 102 a reference signal received power (RSRP) information through a medium access control (MAC) element in a PUSCH transmission.

UL RS includes DMRS and sounding RS (SRS). UE 114 transmits DMRS only in a BW of a respective PUSCH or PUCCH. The eNB 102 can use a DMRS to demodulate data signals or UCI signals. A DMRS is transmitted using a Zadoff-Chu (ZC) sequence having a cyclic shift (CS) and an orthogonal covering code (OCC) that eNB 102 can inform to UE 114 through a respective UL DCI format (see also REF 2) or configure by higher layer signaling. UE 114 transmits SRS to provide eNB 102 with an UL CSI. SRS transmission can be periodic (P-SRS) at predetermined SFs, with parameters configured to UE 114 from eNB 102 by higher layer signaling, or aperiodic (A-SRS) as triggered by a DCI format scheduling PUSCH (UL DCI format) or PDSCH (DL DCI format) (see also REF 2 and REF 3).

Information symbols (data or control) in a PUSCH or PUCCH transmission are scrambled with a scrambling sequence. For example, a block of encoded data bits $b^{(q)}(0), \ldots, b^{(q)}(M_{bit}^{(q)}-1)$, where $M_{bit}^{(q)}$ is a number of bits transmitted in codeword $q$ on a PUSCH in a SF, is scrambled with a UE-specific scrambling sequence prior to modulation (see also REF 1).

Figure 4:
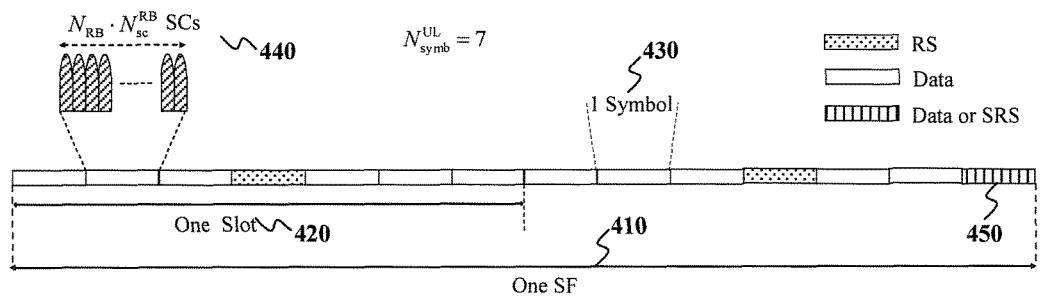
FIG. 4 illustrates an example UL SF structure for PUSCH transmission or PUCCH transmission according to this disclosure.

FIG. 4 illustrates an example UL SF structure for PUSCH transmission or PUCCH transmission according to this disclosure. The embodiment of the UL SF structure shown in FIG. 4 is for illustration only. Other embodiments could be used without departing from the scope of the present disclosure.

In the example shown in FIG. 4, an UL SF 410 includes two slots 420. Each slot 420 includes $N_{symb}^{UL}$ symbols 430 for transmitting data information, UCI, DMRS, or SRS. Each RB includes $N_{sc}^{RB}$ sub-carriers (SCs). UE 114 is allocated $N_{RB}^{UL}$ RBs 440 for a total of $N_{RB}^{UL} \cdot N_{sc}^{RB}$ SCs for a transmission BW. For a PUCCH, $N_{RB}^{UL}=1$. A last SF symbol can be used to multiplex SRS transmissions 450 from one or more UEs. A number of SF symbols that are available for data/UCI/DMRS transmission is $N_{symb}=2 \cdot (N_{symb}^{UL}-1)-N_{SRS}$, where $N_{SRS}=1$ when a last SF symbol is used to transmit SRS and $N_{SRS}=0$ otherwise. Each element in the time-frequency resource grid is called a resource element (RE) and is uniquely defined by the index pair (k,l)

in a slot where k=0, . . . , $N_{RB}^{UL}N_{sc}^{RB}-1$ and l=0, . . . , $N_{symb}-1$ are the indices in the frequency and time domains, respectively.

Figure 5:
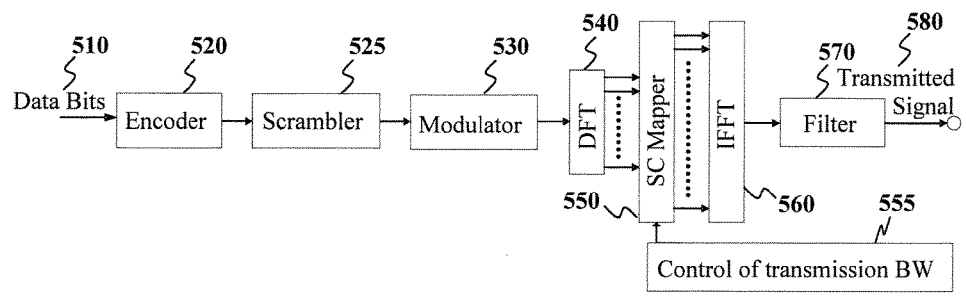
FIG. 5 illustrates a UE transmitter block diagram for a PUSCH in a SF according to this disclosure.

FIG. 5 illustrates a UE transmitter block diagram for a PUSCH in a SF according to this disclosure. The embodiment of the UE PUSCH transmitter block diagram shown in FIG. 5 is for illustration only. Other embodiments could be used without departing from the scope of the present disclosure.

Information data bits 510 are encoded by encoder 520, such as a turbo encoder, scrambled by scrambler 525, and modulated by modulator 530 to output data symbols. A discrete Fourier transform (DFT) filter 540 applies a DFT on the data symbols, SCs 550 corresponding to an assigned PUSCH transmission BW are selected by transmission BW selection unit 555, filter 560 applies an inverse fast Fourier transform (IFFT) and, after a CP insertion (not shown), filtering is applied by filter 570 and a signal transmitted 580. Encoding of a data TB can be by using incremental redundancy, in case of retransmissions of the data TB, and an associated redundancy version (see also REF 2).

Figure 6:
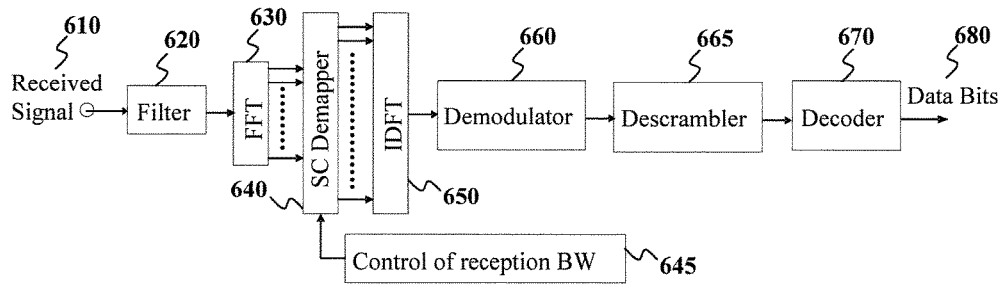
FIG. 6 illustrates an eNB receiver block diagram for a PUSCH in a SF according to this disclosure.

FIG. 6 illustrates an eNB receiver block diagram for a PUSCH in a SF according to this disclosure. The embodiment of the eNB receiver block diagram for a PUSCH shown in FIG. 6 is for illustration only. Other embodiments could be used without departing from the scope of the present disclosure.

A received signal 610 is filtered by filter 620. Subsequently, after a CP is removed (not shown), filter 630 applies a fast Fourier transform (FFT), SCs 640 corresponding to an assigned PUSCH reception BW are selected by a reception BW selector 645, unit 650 applies an inverse DFT (IDFT), a demodulator 660 coherently demodulates data symbols by applying a channel estimate obtained from a DMRS (not shown), a descrambler descrambles the demodulated data symbols 665, and a decoder 670, such as a turbo decoder, decodes the demodulated data symbols according to an encoded redundancy version to provide information data bits 680.

Figure 7:
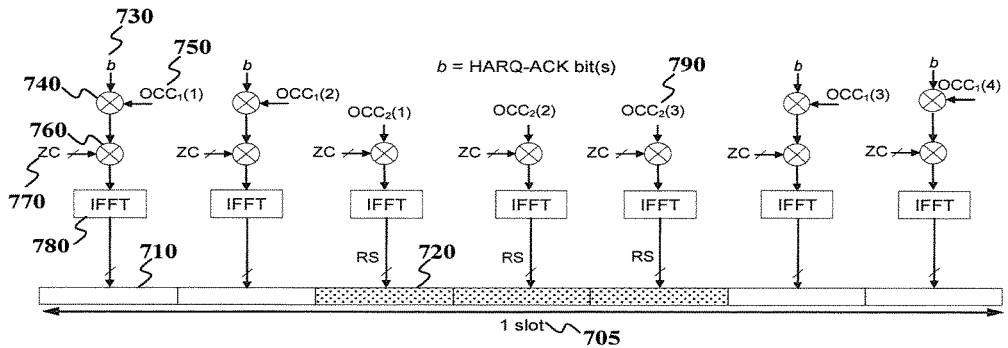
FIG. 7 illustrates a PUCCH structure for transmitting HARQ-ACK information or SR information in one slot of a SF according to this disclosure.

FIG. 7 illustrates a PUCCH structure for transmitting HARQ-ACK information or SR information in one slot of a SF according to this disclosure. The embodiment of the PUCCH structure shown in FIG. 7 is for illustration only. Other embodiments could be used without departing from the scope of the present disclosure.

Each slot 705 of a SF includes transmission of HARQ-ACK or SR signals 710 and of DMRS 720 in a RB. A HARQ-ACK symbol or a SR symbol b 730 is multiplied 740 by an element of a first orthogonal covering code (OCC) 750, as is subsequently described, at each respective SF symbol and modulates 760 a ZC sequence 770 (see also REF 1). For SR transmission, b=1. A modulated ZC sequence is transmitted after performing an IFFT 780. A DMRS is transmitted through an unmodulated ZC sequence that is multiplied by elements of a second OCC 790 at respective SF symbols. UE 114 can transmit both HARQ-ACK and SR in a same SF by selecting a resource configured for SR transmission and transmitting HARQ-ACK (see also REF 1 and REF 3).

Different CSs of a ZC sequence (see also REF 1) can provide orthogonal ZC sequences and can be allocated to different UEs to achieve orthogonal multiplexing of respective HARQ-ACK, SR, and RS transmissions in a same RB. Orthogonal multiplexing can also be achieved in the time domain using OCC. For example, in FIG. 7, a HARQ-ACK signal or a SR signal can be modulated by a length-4 OCC, such as a Walsh-Hadamard OCC, while a RS can be modulated by a length-3 OCC, such as a DFT OCC. When SRS is multiplexed in a last symbol of a SF, a length-3 OCC can also be used for a HARQ-ACK signal or a SR signal. In this manner, a PUCCH multiplexing capacity per RB is increased by a factor of 3 (determined by the OCC with the smaller length). A PUCCH resource $n_{PUCCH}$ in a RB is defined by a pair of an OCC $n_{oc}$ and a CS $\alpha$. A UE can determine a PUCCH resource either implicitly (see also REF 3) or explicitly by radio resource control (RRC) signaling from eNB 102. The sets of length-4 OCC and length-3 OCC, $\{W_0, W_1, W_2, W_3\}$ and $\{D_0, D_1, D_2\}$ respectively, are:

$$\begin{bmatrix} W_0 \\ W_1 \\ W_2 \\ W_3 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}, \begin{bmatrix} D_0 \\ D_1 \\ D_2 \end{bmatrix} = \begin{bmatrix} 1 & 1 & 1 \\ 1 & e^{-j2\pi/3} & e^{-j4\pi/3} \\ 1 & e^{-j4\pi/3} & e^{-j2\pi/3} \end{bmatrix}.$$

Table 1 presents a mapping for a PUCCH resource $n_{PUCCH}$ to an OCC $n_{oc}$ and a CS $\alpha$ assuming a total of 12 CS per SF symbol for a ZC sequence. When all resources within a PUCCH RB are used, resources in an immediately next RB can be used.

TABLE 1

PUCCH Resource Mapping to OCC and CS

| CS α | OCC $n_{oc}$ | | |
|---|---|---|---|
| | $W_0, D_0$ | $W_1, D_1$ | $W_3, D_2$ |
| 0 | $n_{PUCCH}$ = 0 | | $n_{PUCCH}$ = 12 |
| 1 | | $n_{PUCCH}$ = 6 | |
| 2 | $n_{PUCCH}$ = 1 | | $n_{PUCCH}$ = 13 |
| 3 | | $n_{PUCCH}$ = 7 | |
| 4 | $n_{PUCCH}$ = 2 | | $n_{PUCCH}$ = 14 |
| 5 | | $n_{PUCCH}$ = 8 | |
| 6 | $n_{PUCCH}$ = 3 | | $n_{PUCCH}$ = 15 |
| 7 | | $n_{PUCCH}$ = 9 | |
| 8 | $n_{PUCCH}$ = 4 | | $n_{PUCCH}$ = 16 |
| 9 | | $n_{PUCCH}$ = 10 | |
| 10 | $n_{PUCCH}$ = 5 | | $n_{PUCCH}$ = 17 |
| 11 | | $n_{PUCCH}$ = 11 | |

Figure 8:
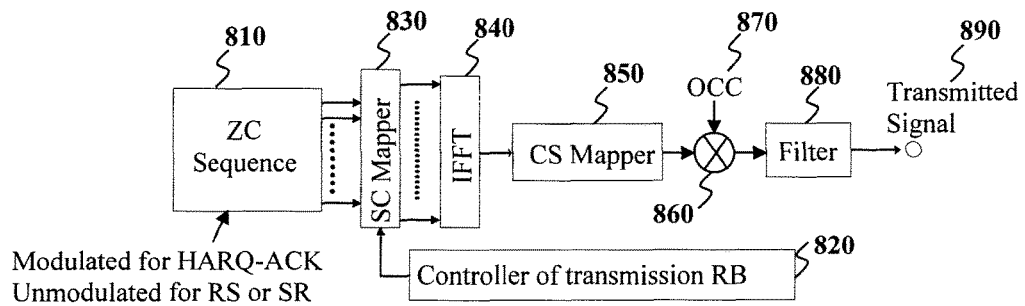
FIG. 8 illustrates a UE transmitter block diagram for HARQ-ACK information or SR information in a PUCCH according to this disclosure.

FIG. 8 illustrates a UE transmitter block diagram for HARQ-ACK information or SR information in a PUCCH according to this disclosure. The embodiment of the UE transmitter block diagram shown in FIG. 8 is for illustration only. Other embodiments could be used without departing from the scope of the present disclosure.

A ZC sequence 810 is generated in the frequency-domain. A first RB and a second RB are selected by controller 820 for transmission 830 of the ZC sequence in a first slot and in a second slot, respectively, an IFFT is performed by IFFT filter 840, and a CS applies to the output by CS mapper 850 that is then multiplied by multiplier 860 with an element of an OCC 870 for a respective SF symbol. As the operations are linear, the multiplication by the element of the OCC can also apply at any other step of the transmitting steps (for example, as in FIG. 7). The multiplication by "1" or "−1" can also be implemented by keeping or reversing a signal sign, respectively. The resulting signal is filtered by filter 880 and transmitted 890.

Figure 9:
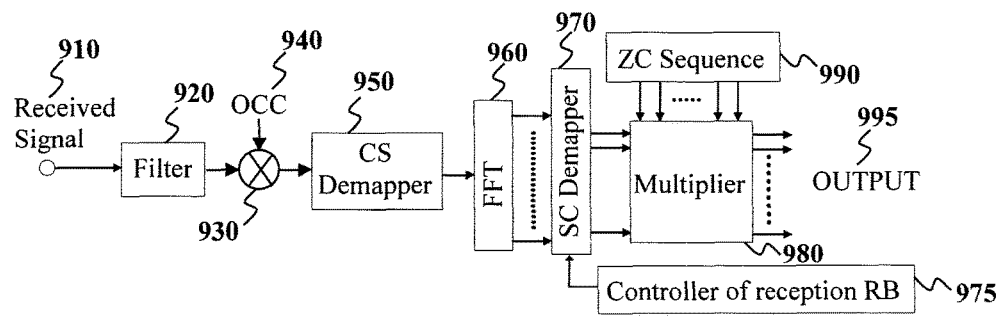
FIG. 9 illustrates an eNB receiver block diagram for HARQ-ACK information or SR information in a PUCCH according to this disclosure.

FIG. 9 illustrates an eNB receiver block diagram for HARQ-ACK information or SR information in a PUCCH according to this disclosure. The embodiment of the eNB receiver block diagram shown in FIG. 9 is for illustration only. Other embodiments could be used without departing from the scope of the present disclosure.

A received signal 910 is filtered by filter 920 and an output is multiplied by multiplier 930 with an element of an OCC 940 for a respective SF symbol. A multiplication by an element of an OCC can apply at any part of the receiving steps. Subsequently, a CS applied at a transmitter is restored by CS demapper 950, a FFT is performed by FFT filter 960, a first RB or a second RB 970 in a first slot or in a second slot, respectively, is selected by controller 975, and a signal is correlated by correlator 980 with a replica 990 of a ZC sequence. An output 995 can then be passed to a channel estimation unit, such as a time-frequency interpolator, in case of the RS, or to a detection unit in case of HARQ-ACK or SR.

Machine type communications (MTC) or Internet of Things (IoT) refers to communication of automated devices in a network. Compared to typical human communication, MTC typically has relaxed latency and quality of service (QoS) requirements and often does not require mobility support. However, MTC also requires that respective UEs have reduced cost and reduced power consumption compared to UEs serving human communications. MTC can be used for a wide variety of applications in different sectors including healthcare, such as monitors, industrial, such as safety and security, energy, such as meters and turbines, transport, such as fleet management and tolls, and consumer and home, such as appliances and power systems.

The requirements of reduced power consumption or low cost for UEs supporting MTC, that can be realized by limiting a power amplifier gain or reducing a number of receiver antennas, can lead to reduced coverage relative to UEs serving human communications. Coverage can be further degraded due to locations of UEs serving MTC that can often be in basements of buildings or, in general, where propagation of radio signals experiences substantial pathloss. For these reasons, supporting coverage enhancements (CE) for transmissions to or from UEs serving MTC is an essential feature for a communication system supporting MTC. In scenarios requiring large CE, communications typically have characteristics of low data rate, delay tolerance, and limited UE mobility. Not all UEs require CE or require a same level of CE. Also, coverage limited UEs typically require low power consumption and communicate with infrequent small burst transmissions. In addition, in different deployment scenarios, a required CE level can be different for different eNBs depending, for example, on an eNB transmission power, or a number of eNB receiver antennas, or an associated cell size, as well as for different UEs, for example depending on a location of a UE or on a power amplifier class of a UE.

Support for CE is typically enabled by repeating transmissions either in the time domain or also in the frequency domain at least in the DL. In the UL, in order to maximize or increase a power spectral density when UE 114 is coverage limited, repetitions of a transmission are typically in one RB and with a maximum transmission power. Since support for CE consumes additional resources and results to lower spectral efficiency or increased power consumption, it is beneficial to enable adjustments of resources according to a required CE level while minimizing or reducing UE power consumption.

For cost reduction purposes, UEs can transmit only in a small BW, such as in a maximum of 6 RBs, and can receive only in a small BW, such as in a maximum of 6 RBs. A BW of 6 consecutive RBs is referred to as a narrowband. Frequency hopping (FH) for a channel transmission can provide significant gains in reception reliability and reduce a number of repetitions for achieving a CE level. For a PUCCH transmission from UE 114 that can only transmit within a narrowband of 6 RBs, FH over a system BW larger than 6 RBs requires that UE 114 transmitter retunes its radio frequency to a different narrowband. Such retuning is associated with a delay that can be as large as 2 SF symbols.

PDCCH/PDSCH transmissions to UE 114 requiring CE can use most or all of the 6 RBs of a narrowband in order to reduce a number of repetitions. As a consequence, few UEs are typically expected to transmit HARQ-ACK repetitions over a set of one or more SFs in response to respective PDCCH/PDSCH receptions. It is therefore beneficial for PUCCH resources used for HARQ-ACK transmission or SR transmission to be shared among UEs that can require different CE levels in order to avoid using multiple RBs to multiplex only few UEs of same CE level per RB and to avoid introducing unnecessary overhead in an UL system BW. However, due to existence of timing errors, near-far effects can exist when UEs requiring different CE levels multiplex respective HARQ-ACK transmissions or SR transmissions using different respective OCCs in a same RB.

The eNB 102 can configure UE 114 a number of repetitions for a transmission or for a reception of a channel in order to achieve a target CE level. For example, eNB 102 can configure UE 114 a first number of SFs for reception of PDSCH repetitions, a second number of SFs for transmission of PUSCH repetitions, and so on. For a PDSCH transmission scheduled by a DL DCI format or for a PUSCH transmission scheduled by an UL DCI format, eNB 102 can indicate a number of repetitions, among a configured set of numbers of repetitions, through a field in the DL DCI format or the UL DCI format, respectively.

Although repetitions for a PUSCH transmission or for a PUCCH transmission can improve a SINR for data symbols or control symbols after combining of repetitions, detection reliability is still limited by a reliability of a channel estimate used for coherent demodulation of the data symbols or of the control symbols. It is therefore important to enhance channel estimation reliability as this can result to a significant reduction in a number of required PUSCH repetitions or PUCCH repetitions, thereby reducing power consumption for UE 114 and improving system spectral efficiency.

Enhanced channel estimation reliability can be achieved by DMRS filtering across SFs used for repetitions of a channel transmission. However, such filtering is limited by a frequency offset between UE 114 and eNB 102 when UE 114 is quasi-stationary and does not experience a Doppler shift as it is typically the case when UE 114 requires CE. Assuming a maximum frequency error of 0.05 parts per million (ppm) for a local oscillator (LO) at eNB 102 and of 0.1 ppm for a LO at UE 114 and a carrier frequency of 2 GHz, a maximum frequency offset due to the LO errors is 300 Hz. Such a frequency offset results to a phase shift over one SF of $2\pi \times 300$ (Hz)$\times 1e-3$ (sec)=$3\pi/5$ that is large enough to preclude inter-SF DMRS filtering and even limit benefits from intra-SF DMRS filtering.

One approach for eNB 102 to estimate and correct a frequency offset is to correlate, in time or in frequency, successive PUSCH DMRS transmitted from UE 114. Similar, UE 114 can use a CRS or a DMRS to estimate and correct a frequency offset. A frequency offset estimate, $f_{offset}$, can be obtained as $f_{offset} = \angle \rho / (2\pi \cdot T)$ where $\angle \rho$ is a phase of a correlation $\rho$ and $T$ is a time interval between DMRS symbols such as 0.5e-3 seconds when DMRS is placed in a middle symbol in each slot of a SF as in FIG. 4. A receiver can apply a frequency offset correction prior to channel estimation and demodulation. For example, in FIG. 9, the eNB 102 receiver can apply a frequency offset correction after the IDFT and prior to the demodulator. When UE 114 experiences a very low SINR, such as below −5 deciBell (dB), a value of ∠ρ is not reliable as it is can be dominated by noise and a frequency offset correction can actually increase an actual frequency offset.

Certain embodiments of this disclosure enable retuning for repetitions of a PUCCH transmission in RBs located in different narrowbands while maintaining a same PUCCH multiplexing capacity as when there is no retuning. Certain embodiments of this disclosure also enable multiplexing of HARQ-ACK transmissions or SR transmissions from UEs operating with different CE levels in a same RB during a same set of one or more SFs. Additionally, certain embodiments of this disclosure enable a frequency offset correction based on replicas of information symbols in repetitions of a channel transmission. Finally, certain embodiments of this disclosure enable an eNB to adjust a number of repetitions for a channel transmission depending on a correction of a frequency offset for the channel transmission.

A first embodiment of the disclosure considers a PUCCH structure incorporating a retuning delay.

UE 114 is assumed to be capable to transmit only within 6 RBs of an UL system BW and to receive only within 6 RBs of a DL system BW at a given time instance. To enable FH for repetitions of a PUCCH transmission in different narrowbands, UE 114 needs to retune its transmitter to a frequency of a RB in a narrowband after FH. This retuning requires a delay that can be as large as 2 SF symbols. In addition to providing frequency diversity, improving an accuracy of a channel estimate used for coherent demodulation of HARQ-ACK symbols or SR symbols in a PUCCH can result to significant enhancements in respective reception reliability. Such improvement can be achieved by enabling inter-SF RS filtering. Therefore, it is beneficial to use structure for a PUCCH transmission with repetitions that enables both FH for frequency diversity and inter-SF RS filtering for improved CE while avoiding reducing a PUCCH multiplexing capacity.

Figure 10:
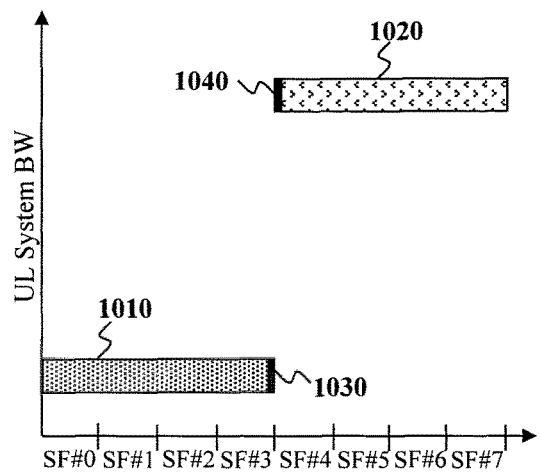
FIG. 10 illustrates a retuning structure for a PUCCH transmission with repetitions according to this disclosure.

FIG. 10 illustrates a retuning structure for a PUCCH transmission with repetitions according to this disclosure.

The eNB 102 configures UE 114 to transmit repetitions of a PUCCH transmission over eight SFs. The PUCCH transmission can convey HARQ-ACK or SR. UE 114 transmits first four repetitions in respective first four SFs in a first PUCCH resource of a first RB in a first narrowband 1010. UE 114 transmits second four repetitions in respective second four SFs in a second PUCCH resource of a second RB in a second narrowband 1020. The first and second PUCCH resources can be considered as part of a single PUCCH resource that is separately defined in the first four SFs and in the second four SFs. For example, UE 114 can determine a PUCCH resource in the second four SFs from a first PUCCH resource in the first four SFs (see also REF 1). UE 114 suspends PUCCH transmission in a last symbol of a last SF of the first four SFs 1030 and in a first symbol of a first SF of the second four SFs 1040 in order to perform retuning from a frequency of the first RB in the first narrowband to a frequency of the second RB of the second narrowband for the PUCCH transmission. With the exception of the PUCCH transmission in the fifth SF, the PUCCH transmission in the other SFs can have a structure as in FIG. 4 or in FIG. 5 where transmission in a last symbol of a SF can be suspended in case SRS transmission is multiplexed or in case UE 114 needs to perform retuning. For the PUCCH structure in the fifth SF, transmission in a first SF symbol is suspended in order for the UE to perform retuning.

An advantage of partitioning two SF symbols required for UE 114 to retune between two narrowbands as in FIG. 10 is that a PUCCH multiplexing capacity is not reduced. For example, when the two SF symbols are both placed in a same SF, a number of SF symbols that is available for HARQ-ACK transmission or SR transmission in a second slot of a last SF prior to retuning is equal to two (instead of three as in FIG. 10). As a consequence, a smallest OCC length for orthogonal multiplexing of HARQ-ACK transmissions or SR transmissions from different UEs is two resulting to a multiplexing capacity of two UEs across the OCC domain (UEs using a same CS and different OCCs). For example, for 6 available CS, a UE multiplexing capacity for HARQ-ACK transmissions or SR transmissions in a RB would be reduced from 3×6=18 as in FIG. 7 (or FIG. 11 below) to 2×6=12 when both SF symbols required for retuning are placed in a same SF such as the fourth SF (last SF prior to retuning) or the fifth SF (first SF after retuning) in FIG. 10.

Figure 11:
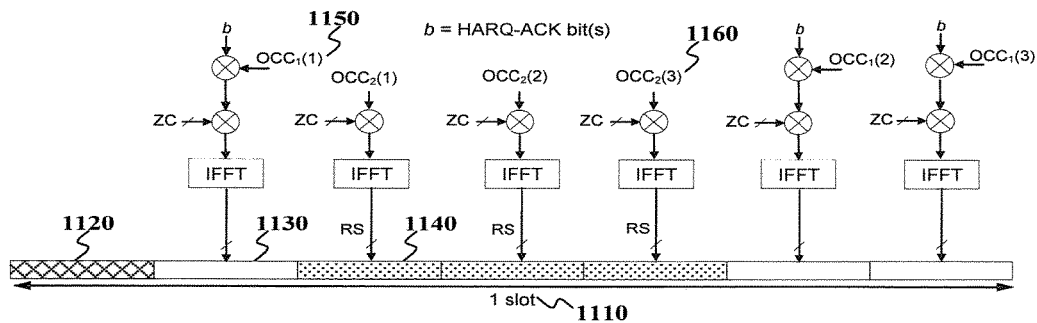
FIG. 11 illustrates a PUCCH transmission structure where transmission a first SF symbol is suspended according to this disclosure.

FIG. 11 illustrates a PUCCH transmission structure where transmission a first SF symbol is suspended according to this disclosure.

A PUCCH transmission structure is similar to the one in FIG. 7 and descriptions for functionalities with direct correspondence are omitted for brevity. In a first slot 1110 of a SF that includes two slots, UE 114 suspends HARQ-ACK transmission or SR transmission in a PUCCH in a first symbol 1120. UE 114 transmits HARQ-ACK or SR in 3 symbols of the first slot 1130 and transmits RS in remaining 3 symbols 1140 of the first slot (and also in the second slot of the SF). UE 114 uses an OCC of length-3 1150 to transmit HARQ-ACK or SR in the 3 symbols of the slot. The OCC can be same as the OCC for the RS 1160.

When FH for repetitions of a PUCCH transmission between a first narrowband and a second narrowband applies more than once and retuning is needed from the second narrowband to the first narrowband, the structures in FIG. 10 and FIG. 11 remain applicable as the second narrowband is now the first narrowband and the first narrowband is now the second narrowband since retuning is now from the second narrowband to the first narrowband. Then, for retuning, a PUCCH transmission is punctured in the last SF symbol of the last repetition in the second narrowband and in the first SF symbol of the first repetition in the first narrowband.

A second embodiment of the disclosure considers multiplexing HARQ-ACK transmissions or SR transmissions with different numbers of repetitions for different CE levels.

An ability to multiplex, in a same RB of a PUCCH, repetitions of HARQ-ACK transmissions or of SR transmissions with different numbers of repetitions from UEs requiring different CE levels is limited by the near-far effect that can occur due to timing differences among the transmissions at the eNB 102 receiver. Then, signaling from a first UE requiring a larger CE level can experience substantial interference from signaling from a second UE requiring a lower CE level and a probability for an incorrect decision by eNB 102 for a HARQ-ACK or a SR for the first UE significantly increases.

In a given SF, a number of UEs transmitting HARQ-ACK or SR with repetitions in a PUCCH is typically not large. Therefore, maximizing or increasing a PUCCH multiplexing capacity per CE level is not an optimal design when PUCCH transmissions from only a few UEs with a same CE level are multiplexed in a same RB and PUCCH transmissions from UEs with different CE levels are multiplexed in different RBs in a SF. Instead, it is preferable to use a same RB to multiplex PUCCH transmissions from UEs requiring different CE levels even when a reduction in the PUCCH multiplexing capacity occurs. For example, when 2 UEs requiring a first CE level (first number of repetitions), 2 UEs requiring a second CE level (second number of repetitions), and 1 UE requiring a third CE level (third number of repetitions) transmit HARQ-ACK or SR in a PUCCH in a same SF, it is preferable to multiplex all respective PUCCH transmissions (conveying HARQ-ACK or SR) in a same RB instead of using a separate RB for each CE level.

A near-far effect that occurs when PUCCH transmissions from UEs requiring different CE levels are multiplexed in a same RB during a same SF can be suppressed by eliminating time-domain multiplexing based on a use of different OCCs. Instead, only multiplexing in a CS domain can apply. A PUCCH multiplexing capacity in a RB is reduced by a factor equal to the smaller OCC length, such as a factor of 3, but such reduction is acceptable when a total number of UEs requiring different CE levels and having PUCCH transmission in a same SF is smaller than or equal to a number of CS that can be used for multiplexing PUCCH transmissions in a same RB during a same SF. Therefore, the disclosure considers disabling OCC-based multiplexing and using only CS-based multiplexing for PUCCH transmissions conveying HARQ-ACK or SR.

Table 2 presents an exemplary mapping for a PUCCH resource $n_{PUCCH}$ to a CS α assuming that an OCC of all ones (equivalent to no OCC) applies to SF symbols used for HARQ-ACK or SR transmission or for RS transmission. Other mappings can also be used such as, for example, mapping a CS to a PUCCH resource in an ascending order where CS=0 is mapped to $n_{PUCCH}=0$, CS=1 is mapped to $n_{PUCCH}=1$, and so on.

TABLE 2

PUCCH Resource Mapping to CS

| CS α | PUCCH resource $n_{PUCCH}$ |
|---|---|
| 0 | $n_{PUCCH} = 0$ |
| 1 | $n_{PUCCH} = 6$ |
| 2 | $n_{PUCCH} = 1$ |
| 3 | $n_{PUCCH} = 7$ |
| 4 | $n_{PUCCH} = 2$ |
| 5 | $n_{PUCCH} = 8$ |
| 6 | $n_{PUCCH} = 3$ |
| 7 | $n_{PUCCH} = 9$ |
| 8 | $n_{PUCCH} = 4$ |
| 9 | $n_{PUCCH} = 10$ |
| 10 | $n_{PUCCH} = 5$ |
| 11 | $n_{PUCCH} = 11$ |

Figure 12:
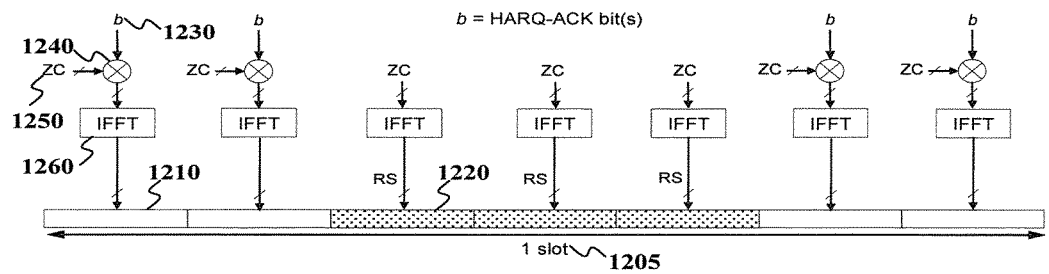
FIG. 12 illustrates a PUCCH structure for transmitting HARQ-ACK information or SR information in one slot of a SF without multiplication by an OCC according to this disclosure.

FIG. 12 illustrates a PUCCH structure for transmitting HARQ-ACK information or SR information in one slot of a SF without multiplication by an OCC according to this disclosure.

The operations in FIG. 12 are same with the ones in FIG. 7 except that a multiplication by elements of an OCC is not applied to SF symbols used for HARQ-ACK or SR transmission or for RS transmission. Each slot 1205 includes transmission of HARQ-ACK signals or SR signals 1210 and RS 1220 in a RB. An HARQ-ACK symbol b 1230 modulates 1240 a ZC sequence 1250. The modulated ZC sequence is transmitted after performing an IFFT 1260. For SR transmission, b=1. A RS is transmitted through an unmodulated ZC sequence. FIG. 12 can also be combined with FIG. 11 to result to a transmission structure over one slot where UE 114 suspends PUCCH transmission (and eNB 102 suspends PUCCH reception) in a first SF symbol (in addition to possible suspension in a last SF symbol).

Figure 13:
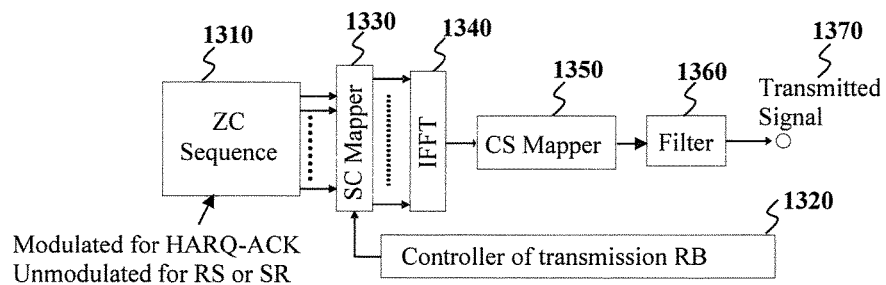
FIG. 13 illustrates a UE transmitter for HARQ-ACK or SR information in a PUCCH without multiplication of HARQ-ACK or SR symbols or of RS symbols with an OCC according to this disclosure.

FIG. 13 illustrates a UE transmitter for HARQ-ACK or SR information in a PUCCH without multiplication of HARQ-ACK or SR symbols or of RS symbols with an OCC according to this disclosure.

A ZC sequence is generated in the frequency-domain 1310. A first RB and a second RB are selected 1320 for transmission 1330 of the ZC sequence in a first slot and in a second slot, respectively, an IFFT is performed by IFFT filter 1340, and a CS mapper applies a CS to the output of the IFFT 1350. Subsequently, the signal is filtered by filter 1360 and transmitted 1370.

Figure 14:
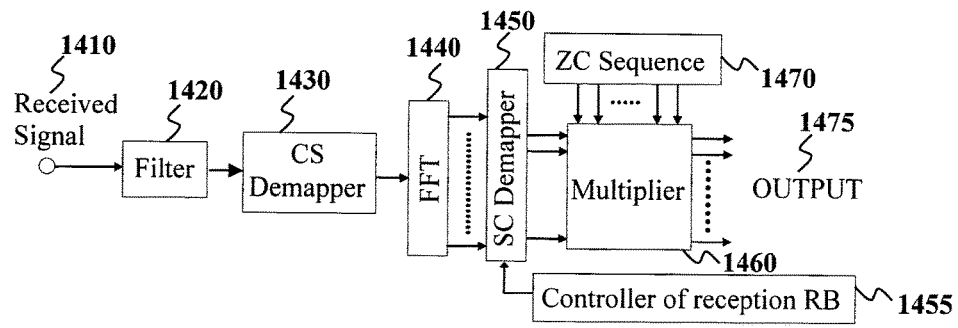
FIG. 14 illustrates an eNB receiver for HARQ-ACK or SR information in a PUCCH without multiplication of HARQ-ACK or SR symbols or of RS symbols with an OCC according to this disclosure.

FIG. 14 illustrates an eNB receiver for HARQ-ACK or SR information in a PUCCH without multiplication of HARQ-ACK or SR symbols or of RS symbols with an OCC according to this disclosure.

A received signal 1410 is filtered by filter 1420. Subsequently, a CS applied at a transmitter is restored by CS demapper 1430, a FFT is applied by FFT filter 1440, a first RB or a second RB 1450 in a first slot or in a second slot, respectively, is selected by controller 1455, and a signal is correlated by correlator 1460 with a replica 1470 of a ZC sequence. An output 1475 can then be passed to a channel estimation unit, such as a time-frequency interpolator, in case of the RS, or to a detection unit in case of HARQ-ACK or SR.

A third embodiment of the disclosure considers a frequency offset determination based on correlations of signal replicas received over multiple SFs. An exemplary realization considers a frequency offset determination at eNB 102 based on correlations of PUSCH DMRS replicas received over multiple SFs but the same principle can apply either at an eNB 102 receiver or at a UE 114 receiver using received replicas of any other signal. For brevity, the third embodiment of the disclosure is described with reference to the eNB 102 receiver.

The eNB 102 receiver can estimate a frequency offset for a reception of a channel from UE 114 (cumulative frequency offset due to frequency offsets at UE 114 transmitter and eNB 102 receiver) as an average of individual frequency offset estimates obtained from correlations among DMRS in a PUSCH reception over a number of repetitions in respective SFs. Denoting by $N_{PUSCH}$ a number of repetitions over a respective number of SFs for a PUSCH transmission from UE 114, an eNB 102 receiver can use the DMRS in $N_{PUSCH,1} \leq N_{PUSCH}$ repetitions to determine a frequency offset. When UE 114 requires CE operation, UE 114 typically has limited mobility (including no mobility) and a phase introduced by a frequency offset changes linearly with time (but can be interpreted modulo 2π). Therefore, a correlation among DMRS symbols to obtain a frequency offset estimate need not be limited to successive DMRS symbols in time.

For brevity, the following descriptions consider that correlations among DMRS symbols can be over two successive DMRS symbols but any number of successive DMRS symbols can apply. Denoting by $T_0$ a slot duration, for example $T_0=0.5e-3$ seconds, and by $T_1$ a SF duration, for example $T_1=1e-3$ seconds, a phase shift over a SF is $T_1/T_0$ times larger than a phase shift over a slot. For $0 \leq i < N_{PUSCH,1}-1$, assuming correlation among DMRS symbols in the time domain (similar arguments apply for correlation among DMRS symbols in the frequency domain across SCs) and denoting by $p_{i,0}$ a received DMRS symbol in the first slot of SF i, by $p_{i,1}$ a received DMRS symbol in the second slot of SF i, and by $p_{i+1,0}$ a received DMRS symbol in a first slot of SF i+1, a first frequency offset estimate can be obtained as $\hat{f}_{offset}(i,0,0)=\angle\rho_{i,0,0}/(2\pi\cdot T_0)$ or as $\hat{f}_{offset}(i,1,0)=\angle\rho_{i,1,0}/(2\pi\cdot T_0)$, where $\rho_{i,0,0}=p_{i,0}\cdot p^*_{i,1}$, and $\rho_{i,1,0}=p_{i,1}\cdot p^*_{i+1,0}$, where $p^*_{i,1}$ and $p^*_{i+1,0}$ are respectively the complex conjugates of $p_{i,1}$ and $p_{i+1,0}$. A second frequency offset can be obtained as $\hat{f}_{offset}(i,0,1)=\angle\rho_{i,0,1}/(2\pi\cdot T_1)$ or as $\hat{f}_{offset}(i,1,1)=\angle\rho_{i,1,1}/(2\pi\cdot T_1)$, where $\rho_{i,0,1}=p_{i,0}\cdot p^*_{i+1,0}$ and $\rho_{i,1,1}=p_{i,1}\cdot p^*_{i+1,1}$. Therefore, a frequency offset estimate can be obtained as $$\hat{f}_{offset} = \frac{1}{2\cdot(N_{PUSCH,1}-1)}\sum_{j=0}^{1}\sum_{i=0}^{N_{PUSCH,1}-1}(\hat{f}_{offset}(i,j,0)+\hat{f}_{offset}(i,j,1))/2.$$

It is also possible for eNB 102 to compute the correlations $\rho_{i,j,0}$ and $\rho_{i,j,1}$, $0\le i<N_{PUSCH,1}-1$ and $0\le j\le 1$, obtain a first average correlation as $$\tilde{\rho}(0) = \frac{1}{2\cdot(N_{PUSCH,1}-1)}\sum_{i=0}^{N_{PUSCH,1}-1}\sum_{j=0}^{1}\rho_{i,j,0}$$

or as $$\tilde{\rho}(0) = \frac{1}{2\cdot(N_{PUSCH,1}-1)+1}\left(\rho_{N_{PUSCH,1}-1,0,0}+\sum_{i=0}^{N_{PUSCH,1}-1}\sum_{j=0}^{1}\rho_{i,j,0}\right),$$

a second average correlation as $$\tilde{\rho}(1) = \frac{1}{2\cdot(N_{PUSCH,1}-1)}\sum_{i=0}^{N_{PUSCH,1}-1}\sum_{j=0}^{1}\rho_{i,j,1},$$

a first frequency offset estimate as) $\hat{f}_{offset}(0)=\angle\tilde{\rho}(0)/(2\pi\cdot T_0)$, a second frequency offset estimate as $\hat{f}_{offset}(1)\le\angle\tilde{\rho}(1)/(2\pi\cdot T_1)$, and compute a final frequency offset estimate as $\hat{f}_{offset}=(\hat{f}_{offset}(0)+\hat{f}_{offset}(1))/2$. In general, different weights can be assigned for $\hat{f}_{offset}(0)$ and $\hat{f}_{offset}(1)$ and $\hat{f}_{offset}=w(0)\cdot\hat{f}_{offset}(0)+w(1)\cdot\hat{f}_{offset}(1)$ where $w(0)+w(1)=1$. As a phase of a correlation does not depend on a scaling for the correlation, scaling factors for computing $\tilde{\rho}(0)$ or $\tilde{\rho}(1)$ are optional.

An extension for a correlation of a DMRS symbol with multiple other DMRS symbol, instead of only with an immediately next DMRS symbol, that is enabled from an assumption of limited/no mobility for UE 114 operating with CE resulting to a phase shift that can be uniquely attributed to a frequency offset (cumulative frequency offset due to frequency offsets at UE 114 transmitter and eNB 102 receiver), can result to a noise averaging when computing a frequency offset that can in turn result to a larger effective SINR and a more accurate frequency offset estimate.

Figure 15:
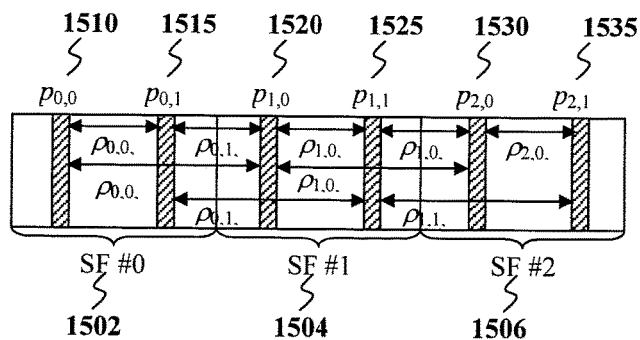
FIG. 15 illustrates an example frequency offset estimation based on correlations across SCs of a DMRS symbol with subsequent DMRS symbols over three SFs according to this disclosure.

FIG. 15 illustrates an example frequency offset estimation based on correlations across SCs of a DMRS symbol with subsequent DMRS symbols over three SFs according to this disclosure.

UE 114 transmits a PUSCH with 3 repetitions over respective SFs, SF#0 1502, SF#1 1504, and SF#2 1506. The eNB 102 receiver correlates a DMRS symbol in a first slot of SF#0, $p_{0,0}$, 1510 with a DMRS symbol in the second slot of SF#0, $p_{0,1}$, 1515 to obtain a first correlation $\rho_{0,0,0}=p_{0,0}\cdot p^*_{0,1}$ and with a DMRS symbol in the first slot of SF#1, $p_{1,0}$, 1520 to obtain a second correlation $\rho_{0,0,1}=p_{0,0}\cdot p^*_{1,0}/2$. It is assumed that a time between a DMRS symbol in a first slot of a SF and a DMRS symbol in a first slot of an immediately next SF (one SF) is twice a time between a DMRS symbol in the first slot of the SF and a DMRS in a second slot of the SF (one slot). The eNB 102 receiver correlates the DMRS symbol in the second slot of SF#0, $p_{0,1}$, 1515 with the DMRS symbol in the first slot of SF#1, $p_{1,0}$, 1520 to obtain a third correlation $\rho_{0,1,0}=p_{0,1}\cdot p^*_{1,0}$ and with the DMRS symbol in the second slot of SF#1, $p_{1,1}$, 1525 to obtain a fourth correlation $\rho_{0,1,1}=p_{0,1}\cdot p^*_{1,1}/2$. The eNB 102 receiver correlates the DMRS symbol in the first slot of SF#1, $p_{1,0}$, 1520 with the DMRS symbol in the second slot of SF#1, $p_{1,1}$, 1525 to obtain a fifth correlation $\rho_{1,0,0}=p_{1,0}\cdot p^*_{1,1}$ and with the DMRS symbol in the first slot of SF#2, $p_{2,0}$, 1530 to obtain a sixth correlation $\rho_{1,0,1}=p_{0,1}\cdot p^*_{1,1}/2$. The eNB 102 receiver correlates the DMRS symbol in the second slot of SF#1, $p_{1,1}$, 1525 with the DMRS in the first slot of SF#2, $p_{2,0}$, 1530 to obtain a seventh correlation $\rho_{1,1,0}=p_{1,1}\cdot p^*_{2,0}$ and with the DMRS in the second slot of SF#2, $p_{2,1}$, 1535 to obtain an eighth correlation $\rho_{1,1,1}=p_{1,1}\cdot p^*_{2,1}/2$. Finally, the eNB 102 receiver can correlate the DMRS symbol in the first slot of SF#2, $p_{2,0}$, 1530 with the DMRS symbol in the second slot of SF#2, $p_{2,1}$, 1535 to obtain a ninth correlation $\rho_{2,0,0}=p^*_{2,0}\cdot p_{2,1}$. The eNB 102 receiver can obtain a first average correlation as $$\tilde{\rho}(0) = \frac{1}{2\cdot 2}\sum_{i=0}^{1}\sum_{j=0}^{1}\rho_{i,j,0}$$

or as $$\tilde{\rho}(0) = \frac{1}{2\cdot 2+1}\left(\rho_{2,0,0}+\sum_{i=0}^{1}\sum_{j=0}^{1}\rho_{i,j,0}\right),$$

a second $$\tilde{\rho}(1) = \frac{1}{2\cdot 2}\sum_{i=0}^{1}\sum_{j=0}^{1}\rho_{i,j,1},$$

a first frequency offset estimate as $\hat{f}_{offset}(0)=\angle\tilde{\rho}(0)/(2\pi\cdot T_0)$, a second frequency offset estimate as $\hat{f}_{offset}(1)=\angle\tilde{\rho}(1)/(2\pi\cdot T_1)$, and can compute a final frequency offset estimate as $\hat{f}_{offset}=(\hat{f}_{offset}(0)+\hat{f}_{offset}(1))/2$.

A fourth embodiment of the disclosure considers a frequency offset determination based on correlations of PUSCH DMRS symbols and PUSCH data symbols over multiple SFs.

The eNB 102 receiver can determine an estimate of a frequency offset (cumulative frequency offset due to frequency offsets at UE 114 transmitter and eNB 102 receiver) as an average of individual estimates obtained from symbol-by-symbol time-domain or frequency-domain correlations across SC that include both DMRS symbols and data symbols among SFs corresponding to repetitions of a PUSCH transmission. Denoting by $N_{PUSCH}$ a number of repetitions over a respective number of SFs for a PUSCH transmission from UE 114, the eNB 102 receiver can use both DMRS symbols and data symbols in $N_{PUSCH,1} \leq N_{PUSCH}$ repetitions to obtain a frequency offset estimate.

The fourth embodiment considers that UE 114 applies a same redundancy version (see also REF 2) and same scrambling for data information in consecutive $N_{PUSCH,2} \leq N_{PUSCH,1}$ repetitions of a PUSCH that UE 114 transmits with a same maximum power over respective $N_{PUSCH,2} \leq N_{PUSCH,1}$ SFs. When UCI is multiplexed in the PUSCH transmission, same UCI symbols are repeated in consecutive $N_{PUSCH,2}$ SFs for respective repetitions of the PUSCH transmission. When UE 114 punctures a transmission in a last PUSCH symbol in some SFs because UE 114 transmits SRS or other UEs transmit SRS that partially overlaps with the PUSCH transmission BW, the last SF symbol is not included in a correlation with last symbols in other SFs from the $N_{PUSCH,2}$ SFs. When the last SF symbol is not included in the correlation and without considering SF symbols that can be used for retuning, there are J=13 SF symbols available for correlations, including DMRS symbols and data symbols for a SF structure using a normal CP (J=11 for a SF structure using extended CP); otherwise, J=14 (or J=12 for a SF structure using extended CP).

Even though values of modulated data symbols are not known to the eNB 102 receiver, they are not material for the purpose of estimating a frequency offset as a correlation of same modulated data symbols has a same value regardless of a value of same modulated data symbols. Denoting by d(j,i) a received signal across SCs in SF symbol j of SF i and by d(j,i+1) a received signal across SCs in symbol j of SF i+1, where $0 \leq j < J$ and $0 \leq i < N_{PUSCH,2}-1$, the two signals convey same modulated data symbols as a same redundancy version for the data TB transmission and a same scrambling sequence for data symbols and DMRS symbols is assumed to be used in the consecutive $N_{PUSCH,2}$ SFs. When symbol j conveys DMRS, there are no actual modulated data symbols but a same concept applies as the DMRS can be viewed as conveying a known modulated data symbol, for example having a numeric value of one. Then, a frequency offset estimate $\hat{f}_{offset}(i)$ derived from correlating modulated data symbols across SCs and DMRS symbols in SF i with modulated data symbols across SCs and DMRS symbols in SF i+1 can be obtained as $\hat{f}_{offset}(i) = \angle \tilde{\rho}(i)/(2\pi \cdot T_1)$ where $$\tilde{\rho}(i) = \frac{1}{J} \cdot \sum_{j=0}^{J-1} d(j,i) \cdot d^*(j,i+1)$$

where d* is the complex conjugate of d and $T_1$ is the SF duration, for example $T_1 = 1e-3$ seconds. Extending a computation of the correlation to $M_{PUSCH,2}-1$ SFs, a frequency offset estimate can be obtained as $\hat{f}_{offset} = \angle \tilde{\rho}/(2\pi \cdot T_1)$ where $$\tilde{\rho} = \frac{1}{J \cdot (N_{PUSCH,2}-1)} \cdot \sum_{i=0}^{N_{PUSCH,2}-1} \sum_{j=0}^{J-1} d(j,i) \cdot d^*(j,i+1)$$

(the scaling factor of $1/(N_{PUSCH,2}-1)$ is optional in determining a phase of $\tilde{\rho}$). A frequency offset estimation can also be extended by correlating across SCs (either in the time domain or in the frequency domain) received symbols in SF i with received symbols with same indexes in SF i+l, where l>1.

Figure 16:
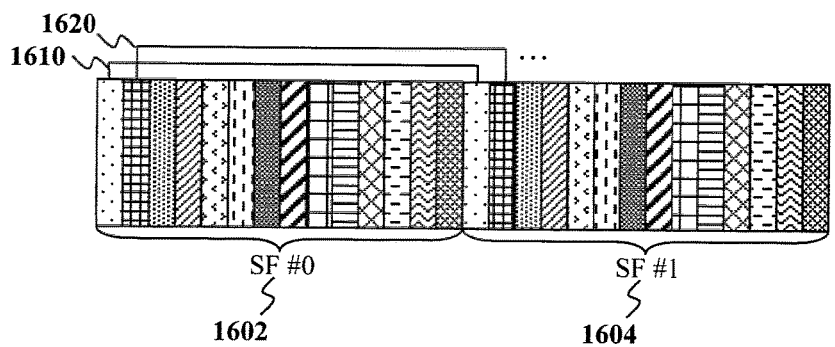
FIG. 16 illustrates an example frequency offset estimation based on correlations across SCs of both DMRS symbols and data symbols in a PUSCH transmission over two SFs according to this disclosure.

FIG. 16 illustrates an example frequency offset estimation based on correlations across SC of both DMRS symbols and data symbols in a PUSCH transmission over two SFs according to this disclosure.

UE 114 transmits a PUSCH with a number of repetitions where two repetitions from the number of repetitions are over SF#0 1602 and SF#1 1604. An eNB 102 receiver performs a SF symbol by SF symbol correlation for SF#0 and SF#1 to obtain J individual correlations. For example, a first correlation is obtained across modulated data symbols or DMRS symbols in SCs of a first SF symbol of SF#0 and in SCs of a first SF symbol of SF#1 1610, when available, a second correlation is obtained across modulated data symbols or DMRS symbols in SCs of a second SF symbol of SF#0 and in SCs of a second SF symbol of SF#1 1620, and so on. As a time interval between SF symbol pairs in each of the J individual correlations is same (one SF), the correlations are equivalent and can be accumulated to provide an average correlation $$\tilde{\rho}(0) = \frac{1}{J} \cdot \sum_{j=0}^{J-1} d(j,0) \cdot d^*(j,1).$$

A frequency offset estimate $\hat{f}_{offset}(0)$ can be obtained as $\hat{f}_{offset}(0) = \angle \tilde{\rho}(0)/(2\pi \cdot T_1)$ where $T_1 = 1e-3$ seconds.

Figure 17:
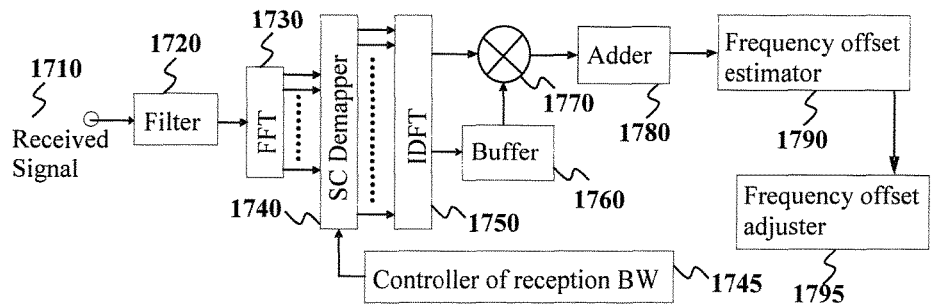
FIG. 17 illustrates an example receiver structure for frequency offset estimation according to this disclosure.

FIG. 17 illustrates an example receiver structure for frequency offset estimation according to this disclosure.

A received signal 1710 is filtered by filter 1720. Subsequently, after a CP is removed (not shown), filter 1730 applies a FFT, SCs 1740 corresponding to an assigned reception BW are selected by a reception BW selector 1745, and unit 1750 applies an inverse DFT (IDFT). A buffer 1760 stores received modulated information symbols or RS symbols over a number of SF symbols and over a number of SCs of the assigned reception BW. A correlator 1770 correlates a symbol from a previous repetition with a symbol, for a same SF symbol and a same SC, of a new repetition for a same channel. An adder 1780 adds the correlations for the number of SF symbols and the number of SCs. A frequency offset estimator 1790 estimates a frequency offset based on the output of the adder 1780. A frequency offset adjustor 1795 subsequently adjusts a reception frequency based on the estimated frequency offset.

A fifth embodiment of the disclosure considers a frequency offset determination based on correlations of symbols in a PUCCH transmission conveying HARQ-ACK information.

The eNB 102 receiver can determine an estimate of a frequency offset (cumulative frequency offset due to frequency offsets at UE 114 transmitter and eNB 102 receiver) based on symbol-by-symbol time-domain or frequency-domain correlations across SCs that include DMRS symbols or both DMRS symbols and HARQ-ACK symbols.

In a first approach, considering the PUCCH SF structure in FIG. 7 or FIG. 11 and that UE 114 does not apply slot-based FH for a PUCCH transmission, the eNB 102 receiver combines, for example by averaging, the three received DMRS symbols in a first slot of a SF to obtain a first combined received DMRS symbol $\bar{p}_0$ and the three received DMRS symbols in a second slot of the SF to obtain a second combined received DMRS symbol $\bar{p}_1$. Due to combining, an SINR of $\bar{p}_0$ or $\bar{p}_1$ is $10 \log_{10}(3) = 4.77$ dB larger than a SINR of individual DMRS symbols thereby allowing for improved estimation of a frequency offset based on a correlation $\rho = \bar{p}_0 \cdot \bar{p}^*_1$. A frequency offset can be computed as $\hat{f}_{offset} = \angle \rho / (2\pi \cdot T_{0'})$ where $T_0 = 0.5e-3$ seconds. Equivalently, denoting by $p_0(j)$ the DMRS symbols in the first slot of the SF and by $p_1(j)$ the DMRS symbols in the second slot of the SF, where $j=0, 1, 2$, the correlation can be obtained as $$\rho = \frac{1}{3} \cdot \sum_{j=0}^{2} p_0(j) \cdot p^*_1(j)$$

where the scaling by ⅓ is optional as it does not affect a phase in the correlation value.

In a second approach, considering the PUCCH SF structure in FIG. 7 or FIG. 11 and that UE 114 does not apply slot-based FH for a PUCCH transmission with repetitions and considering that identical information is transmitted in a SF symbol with a same index in each of the two slots of the SF when a scrambling sequence remains same per SF slot, an eNB 102 receiver can correlate, across SC, symbols with same indexes in each slot to obtain an estimate of a frequency offset for receptions from UE 114. Denoting by $c_0(j)$ the symbols across SCs in a first slot of a PUCCH SF and by $c_1(j)$ the symbols across SCs in a second slot of the PUCCH SF, where for example $j=0, \ldots, 6$, a correlation can be obtained as $$\rho = \frac{1}{7} \cdot \sum_{j=0}^{6} c_0(j) \cdot c^*_1(j).$$

Similar to modulated data symbols in the fourth embodiment, the eNB 102 receiver does not need to know a value for the HARQ-ACK information in order to perform a correlation since the value is same in different PUCCH symbols (other than PUCCH symbols used for DMRS transmission). A frequency offset estimate can be computed as $\hat{f}_{offset} = \angle \rho / (2\pi \cdot T_{0'})$ where $T_0 = 0.5e-3$ seconds.

Figure 18:
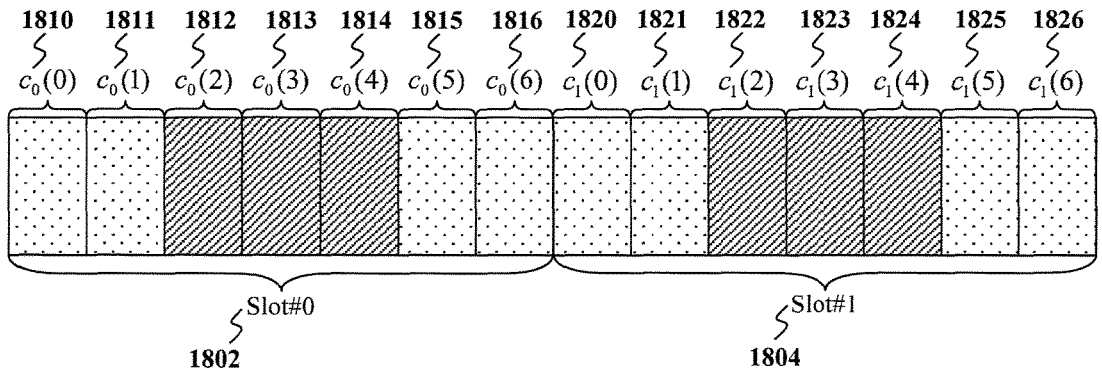
FIG. 18 illustrates an example frequency offset estimation based on correlations across SCs of both DMRS symbols and HARQ-ACK information symbols in a PUCCH transmission over one SF according to this disclosure.

FIG. 18 illustrates an example frequency offset estimation based on correlations across SCs of both DMRS symbols and HARQ-ACK information symbols in a PUCCH transmission over one SF according to this disclosure.

UE 114 transmits a PUCCH over a SF that includes a first slot 1802 and a second slot 1804. A transmission in the first slot and in the second slot is over a same RB of an UL system BW. The eNB 102 receives the PUCCH and performs a symbol by symbol correlation among symbols across SCs in the first slot and symbols in the second slot (assuming use of a same scrambling sequence per slot) to obtain J=7 individual correlations. The first slot includes symbols $c_0(0)$ 1810, $c_0(1)$ 1811, $c_0(5)$ 1815 and $c_0(6)$ 1816 that convey HARQ-ACK symbols and symbols $c_0(2)$ 1812, $c_0(3)$ 1813 and $c_0(4)$ 1814 that convey DMRS symbols. The second slot includes symbols $c_1(0)$ 1820, $c_0(1)$ 1821, $c_1(5)$ 1825 and $c_1(6)$ 1826 that convey HARQ-ACK information and symbols $c_1(2)$ 1822, $c_1(3)$ 1823 and $c_1(4)$ 1824 that convey DMRS symbols. UE 114 transmits same HARQ-ACK information and same DMRS in every respective symbol in the first slot and the second slot. The eNB 102 receiver computes a sum of correlations $$\rho = \frac{1}{7} \cdot \sum_{j=0}^{6} c_0(j) \cdot c^*_1(j)$$

(scaling by ⅐ is optional for the purpose of obtaining a phase of $\rho$) and a frequency offset estimate $\hat{f}_{offset}$ can be obtained as $\hat{f}_{offset} = \angle \rho / (2\pi \cdot T_{0'})$ where $T_0 = 0.5e-3$ seconds. Frequency offset correction based on a PUCCH reception can also be based on repetitions over subframes (instead of slots) in a same manner as for frequency offset correction based on a PUSCH reception.

A sixth embodiment of the disclosure considers eNB 102 adjusting a number of repetitions for an UL transmission from UE 114 before and after a frequency offset correction.

The eNB 102 can adjust a number of repetitions for an UL transmission from UE 114 depending on whether or not eNB 102 corrects a frequency offset for transmissions from UE 114. Similar, the eNB 102 can adjust a number of repetitions for a DL transmission to UE 114 depending on whether or not eNB 102 determines that UE 114 corrects a frequency offset for transmissions from eNB 102. This is because prior to an estimation and correction of a frequency offset that can be above 100 Hz, eNB 102 cannot assume that eNB 102 (or UE 114) can perform inter-SF DMRS filtering in order to improve an accuracy of a channel estimate that eNB 102 (or UE 114) uses to perform coherent demodulation of modulated symbols conveying data information. Without, or with limited, inter-SF DMRS filtering, an accuracy of the channel estimate can become a limiting factor in achieving a target data reception reliability.

The eNB 102 can address an inability to improve an accuracy of a channel estimate prior to correcting a frequency offset, due to a respective inability to perform inter-SF DMRS filtering, by configuring a larger number of repetitions for an UL channel transmission from UE 114 (or for a DL channel transmission to UE 114) than after correcting the frequency offset. For example, eNB 102 needs to correct a frequency offset of UL transmissions from UE 114 when UE 114 establishes initial communication with eNB 102 or, more typically, when UE 114 exits from an extended discontinuous reception state where UE 114 can experience a local oscillator drift. Similar, UE 114 needs to correct a frequency offset of DL transmissions from eNB 102 when UE 114 establishes communication with eNB 102 and UE 114 can also use a transmission with repetitions from eNB 102, such as a PBCH transmission, to correct a frequency offset using symbol replicas in repetitions of a DL channel transmission, such as a PBCH transmission, as it was previously described for example with respect to repetitions of a PUSCH transmission.

In such cases, and for otherwise identical transmitter, receiver, or channel conditions, eNB 102 can configure a larger number of repetitions for a PUSCH transmission prior to correcting a frequency offset in order to ensure a target reception reliability and configure a smaller number of repetitions for a PUSCH transmission after correcting a frequency offset to account for improved reception reliability due to improved channel estimation accuracy that is enabled by inter-SF DMRS filtering. A configuration can be by higher layer signaling, such as RRC signaling, or by physical layer signaling in a physical DL control channel conveying an associated DL DCI format.

Figure 19:
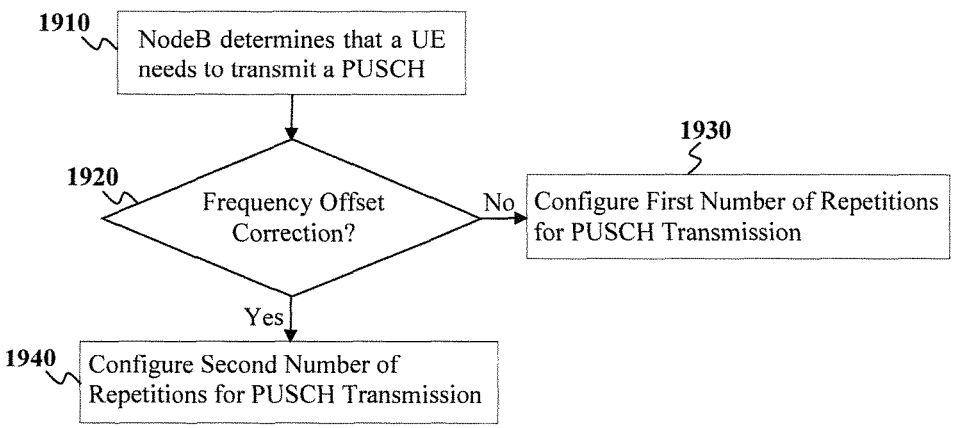
FIG. 19 illustrates a configuration by an eNB to a UE of a number of repetitions for a PUSCH transmission depending on whether or not the eNB corrects a frequency offset according to this disclosure.

FIG. 19 illustrates a configuration by an eNB to a UE of a number of repetitions for a PUSCH transmission depending on whether or not the eNB corrects a frequency offset according to this disclosure.

The eNB 102 determines that UE 114 needs to transmit a PUSCH 1910. For example, for initial access of UE 114 to eNB 102, this determination can be for a PUSCH that UE 114 transmits as part of a random access process (see also REF 3 and REF 4). For example, this determination can be based on a positive SR or on a buffer status report that eNB 102 receives from UE 114. The eNB 102 subsequently determines whether or not can assume a corrected frequency offset for transmissions from UE 114 1920. For example, for initial access or for transmissions immediately after UE 114 exits a discontinuous reception state, eNB 102 can assume an uncorrected frequency offset while for transmissions after initial access or after a first transmission after UE 114 exits a discontinuous reception state, eNB 102 can previously correct a frequency offset. When eNB 102 does not assume a corrected frequency offset, eNB 102 configures to UE 114 a first number of repetitions for a PUSCH transmission 1930 that conveys a data TB size using a set of transmission parameters such as a PRB allocation and a modulation and coding scheme. When eNB 102 assumes a corrected frequency offset, eNB 102 configures to UE 114 a second number of repetitions for a PUSCH transmission 1940 for a same data TB size and for a same set of transmission parameters.

Alternatively, eNB 102 can buffer receptions of repetitions for a PUSCH transmission, possibly after some further processing such as combining, estimate and correct a frequency offset, for example as described in previous embodiments, and subsequently perform demodulation and decoding of modulated data symbols in the buffered receptions of repetitions for the PUSCH transmission.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with example embodiments, various changes and modifications can be suggested to one skilled in the art. It is intended that the present disclosure encompass such changes and modifications that fall within the scope of the appended claims.

What is claimed is:

1. A method for communication between a base station and a user equipment, comprising:
    transmitting a data channel; and
    receiving repetitions of a control channel in response to the transmission of the data channel, wherein:
        a first number of the control channel repetitions is received in a first narrowband over a first number of subframes and a second number of the control channel repetitions is received in a second narrowband over a second number of subframes, and
        the control channel is not received in a last subframe symbol of a last repetition in the first narrowband and the control channel is not received in a first subframe symbol of a first repetition in the second narrowband.

2. The method of claim 1, wherein:
    each of the first and second number of subframes includes first and second slots and each of the first and second slots includes seven symbols,
    the control channel includes third, fourth, and fifth of the seven symbols in each of the first and second slots of each of the first and second number of subframes for reception of reference signals, and
    the control channel includes first, second, sixth, and seventh of the seven symbols for reception of acknowledgement information signals in the first slot of the subframe used for the last repetition in the first narrowband and includes the second, sixth, and seventh symbols for reception of acknowledgement information signals in the first slot of the subframe used for the first repetition in the second narrowband.

3. The method of claim 2, wherein:
    an orthogonal covering code (OCC) of $\{1, 1, 1, 1\}$, $\{1, -1, 1, -1\}$, $\{1, 1, -1, -1\}$, or $\{1, -1, -1, 1\}$ is applied from the first, second, sixth, and seventh symbols when the control channel includes the first, second, sixth, and seventh symbols for reception of acknowledgement information signals, and
    an OCC of $\{1, 1, 1\}$, $\{1, e^{-j2\pi/3}, e^{-j4\pi/3}\}$, or $\{1, e^{-j4\pi/3}, e^{-j2\pi/3}\}$ is applied from the second, sixth, and seventh symbols when the control channel includes the second, sixth, and seventh symbols for reception of acknowledgement information signals.

4. The method of claim 1, wherein:
    a third number of the control channel repetitions is received in the first narrowband over a third number of subframes after the second number of subframes, and
    the control channel is not received in either of a last subframe symbol of a last repetition over the second number of subframes in the second narrowband or in a first subframe symbol of a first repetition over the third number of subframes in the first narrowband.

5. A base station, comprising:
    a transmitter configured to transmit a data channel; and
    a receiver configured to receive repetitions of a control channel in response to the transmission of the data channel, wherein:
        a first number of the control channel repetitions is received in a first narrowband over a first number of subframes and a second number of the control channel repetitions is received in a second narrowband over a second number of subframes, and
        the control channel is not received in a last subframe symbol of a last repetition in the first narrowband and the control channel is not received in a first subframe symbol of a first repetition in the second narrowband.

6. The base station of claim 5, wherein:
    each of the first and second number of subframes includes first and second slots and each of the first and second slots includes seven symbols,
    the control channel includes third, fourth, and fifth of the seven symbols in each of the first and second slots of each of the first and second number of subframes for reception of reference signals, and
    the control channel includes first, second, sixth, and seventh of the seven symbols for reception of acknowledgement information signals in the first slot of the subframe used for the last repetition in the first narrowband and includes the second, sixth, and seventh symbols for reception of acknowledgement information signals in the first slot of the subframe used for the first repetition in the second narrowband.

7. The base station of claim 6, wherein:
    an orthogonal covering code (OCC) of $\{1, 1, 1, 1\}$, $\{1, -1, 1, -1\}$, $\{1, 1, -1, -1\}$, or $\{1, -1, -1, 1\}$ is applied to the first, second, sixth, and seventh symbols when the control channel includes the first, second, sixth, and seventh symbols for reception of acknowledgement information signals, and an OCC of $\{1, 1, 1\}$, $\{1, e^{-j2\pi/3}, e^{-j4\pi/3}\}$, or $\{1, e^{-j4\pi/3}, e^{-j2\pi/3}\}$ is applied to the second, sixth, and seventh symbols when the control channel includes the second, sixth, and seventh symbols for reception of acknowledgement information signals.

8. The base station of claim 5, wherein
a third number of the control channel repetitions is received in the first narrowband over a third number of subframes after the second number of subframes, and
the control channel is not received in either of the last subframe symbol of a last repetition over the second number of subframes in the second narrowband or in a first subframe symbol of a first repetition over the third number of subframes in the first narrowband.

9. A user equipment (UE), comprising:
a receiver configured to receive a data channel; and
a transmitter configured to transmit repetitions of a control channel in response to the reception of the data channel, wherein:
 a first number of the control channel repetitions is transmitted in a first narrowband over a first number of subframes and a second number of the control channel repetitions is transmitted in a second narrowband over a second number of subframes, and
 the control channel is not transmitted in a last subframe symbol of a last repetition in the first narrowband and the control channel is not transmitted in a first subframe symbol of a first repetition in the second narrowband.

10. The UE of claim 9, wherein:
each of the first and second number of subframes includes first and second slots and each of the first and second slots includes seven symbols,
the control channel includes third, fourth, and fifth of the seven symbols in each of the first and second slots of each of the first and second number of subframes for reception of reference signals, and
the control channel includes first, second, sixth, and seventh of the seven symbols for transmission of acknowledgement information signals in the first slot of the subframe used for the last repetition in the first narrowband and includes the second, sixth, and seventh symbols for reception of acknowledgement information signals in the first slot of the subframe used for the first repetition in the second narrowband.

11. The UE of claim 10, wherein:
an orthogonal covering code (OCC) of $\{1, 1, 1, 1\}$, $\{1, -1, 1, -1\}$, $\{1, 1, -1, -1\}$, or $\{1, 31\ 1, -1, 1\}$ is applied to the first, second, sixth, and seventh symbols when the control channel includes the first, second, sixth, and seventh symbols for transmission of acknowledgement information signals, and
an OCC of $\{1, 1, 1\}$, $\{1, e^{-j2\pi/3}, e^{-j4\pi/3}\}$, or $\{1, e^{-j4\pi/3}, e^{-j2\pi/3}\}$ is applied to the second, sixth, and seventh symbols when the control channel includes the second, sixth, and seventh symbols for transmission of acknowledgement information signals.

12. The UE of claim 9, wherein
a third number of the control channel repetitions is transmitted in the first narrowband over a third number of subframes after the second number of subframes, and
the control channel is not transmitted in either of the last subframe symbol of a last repetition over the second number of subframes in the second narrowband or in a first subframe symbol of a first repetition over the third number of subframes in the first narrowband.

* * * * *